United States Patent
Chin

(10) Patent No.: US 7,310,688 B1
(45) Date of Patent: Dec. 18, 2007

(54) RELATIVE ADDRESSING FOR NETWORK ELEMENTS

(75) Inventor: Hon Wah Chin, Palo Alto, CA (US)

(73) Assignee: Ciena Corporation, Linthicum, MD (US)

( * ) Notice: Subject to any disclaimer, the term of this patent is extended or adjusted under 35 U.S.C. 154(b) by 644 days.

(21) Appl. No.: 09/650,254

(22) Filed: Aug. 29, 2000

Related U.S. Application Data

(60) Provisional application No. 60/151,583, filed on Aug. 30, 1999.

(51) Int. Cl.
*G06F 15/16* (2006.01)
*G06F 15/173* (2006.01)
*H04L 12/28* (2006.01)

(52) U.S. Cl. .................. 709/252; 709/238; 370/351

(58) Field of Classification Search ........... 709/249, 709/238, 241; 370/221, 254, 400, 460, 248, 370/397, 258, 351; 379/219
See application file for complete search history.

(56) References Cited

U.S. PATENT DOCUMENTS

| | | | |
|---|---|---|---|
| 5,142,531 A | 8/1992 | Kirby | |
| 5,212,577 A | 5/1993 | Nakamura et al. | |
| 5,465,251 A * | 11/1995 | Judd et al. | 370/351 |
| 5,506,838 A * | 4/1996 | Flanagan | 370/258 |
| 5,566,170 A | 10/1996 | Bakke et al. | 370/60 |
| 5,583,990 A | 12/1996 | Birrittella et al. | |
| 5,699,177 A | 12/1997 | Yamamoto | |
| 5,737,318 A * | 4/1998 | Melnik | 370/254 |
| 5,781,534 A * | 7/1998 | Perlman et al. | 370/248 |
| 5,815,295 A | 9/1998 | Darcie et al. | |
| 5,854,903 A * | 12/1998 | Morrison et al. | 709/249 |
| 5,872,783 A | 2/1999 | Chin | 370/392 |
| 5,883,893 A | 3/1999 | Rumer et al. | 370/395 |
| 5,914,794 A | 6/1999 | Fee et al. | |
| 5,914,798 A | 6/1999 | Liu | |
| 5,917,821 A | 6/1999 | Gobuyan et al. | 370/392 |
| 5,930,014 A | 7/1999 | Yamamoto | |
| 5,959,968 A | 9/1999 | Chin et al. | 370/216 |
| 5,978,115 A | 11/1999 | Condict et al. | |

(Continued)

FOREIGN PATENT DOCUMENTS

WO    WO 97/05725    2/1997

OTHER PUBLICATIONS

Malkin, RFC 1393—Traceroute Using an IP Option, Jan. 1993.*

(Continued)

*Primary Examiner*—Kenny Lin
(74) *Attorney, Agent, or Firm*—Clements Walker; Christopher L. Bernard; Tyler S. Brown

(57) ABSTRACT

A relative address protocol for communicating message packets along a linear chain network or quasi-linear chain network is disclosed. The protocol includes a relative destination address field that includes a counter having a preselected initial value at a source node. The initial value is a function of the desired number of node hops that the message packet should travel from the source node. The counter is adjusted in value at each subsequent node by a preselected step in value. When the counter value reaches a trigger value the message packet is accepted by a destination node. In a preferred embodiment, a relative source address field stores the initial value so that the destination node may return a status message to the source node.

15 Claims, 5 Drawing Sheets

U.S. PATENT DOCUMENTS

| | | | |
|---|---|---|---|
| 6,046,978 A * | 4/2000 | Melnik | 370/221 |
| 6,081,507 A | 6/2000 | Chao et al. | 370/235 |
| 6,130,889 A * | 10/2000 | Feldman et al. | 370/397 |
| 6,163,392 A | 12/2000 | Condict et al. | |
| 6,389,023 B1 * | 5/2002 | Matsuzawa et al. | 370/395.31 |
| 6,421,440 B1 * | 7/2002 | Copley et al. | 379/219 |
| 6,496,516 B1 * | 12/2002 | Dabecki et al. | 370/460 |
| 6,594,268 B1 * | 7/2003 | Aukia et al. | 370/400 |
| 6,801,496 B1 * | 10/2004 | Saleh et al. | 370/221 |
| 6,867,708 B2 * | 3/2005 | Darby et al. | 340/933 |

OTHER PUBLICATIONS

Gavron. Ehud, traceroute faq., Google Groups, Mar. 18, 1996.*

Tada, Y., et al., "OA&M Framework for Multiwavelength Photonic Transport Networks", IEEE Journal on Selected Areas in Communications, vol. 14, No. 5, Jun. 1996, pp. 914-921.

Bischoff, M., et al., "Operation and Maintenance for An All-Optical Transport Network", IEEE Communications Magazine, vol. 34, No. 11, Nov. 1996, pp. 136-142.

Ramaswami, R., et al., "Distributed Network Control for Wavelength Routed Optical Networks", Proceedings of IEE Infocom 1996. Conference on Computer Communications, Fifteenth Annual Joint Conference of the IEEE Computer and Communications Societies. Networking the Next Generation San Francisco, vol. 1, No. CONF. 15, Mar. 1996, pp. 138-147, Institute of Electric and Electronics Engineers, right-hand column, lines 16-18, p. 139.

* cited by examiner

RELATIVE ADDRESSING FOR NETWORK ELEMENTS

RELATED APPLICATIONS

This application claims the benefit of U.S. provisional application Ser. No. 60/151,583, "Relative Addressing For Network Elements," by inventor Hon Wah Chin, filed Aug. 30, 1999, the entire contents of which are hereby incorporated by reference.

BACKGROUND OF THE INVENTION

1. Field of the Invention

The present invention relates generally to address protocols for transmitting information packets between the nodes of a network and to methods of network fault detection and isolation.

2. Description of Background Art

Packet data networks, such as optical networks and computer networks, have network nodes coupled by data links. There are a variety of different network topologies, such as linear, branched, mesh, and ring topologies. Packet data networks transmit data to network nodes in the form of message packets. Each message packet comprises a protocol data unit (PDU) that includes a message body (also known as the payload) and a header. The header contains source and destination address information that other network elements use to forward the message packet to its intended destination.

Conventional packet message forwarding techniques rely upon each node of a data network having a pre-determined network address. The address of each node may be assigned at the time the network is designed or may be assigned via a configuration process, such as a broadcast configuration process in which the nodes negotiate specific node addresses. In either case, prior to using the network for data communications, each network node has a pre-determined address. Network elements forward the message packet through the network to the receiving node based upon the pre-determined address along with other information related to protocols or rules for forwarding a message packet for a particular network topology.

There are several commonly used address protocols used in the network industry. These include the Ethernet address protocol, described in the Institute of Electrical and the Electronic Engineers (IEEE) standard 802.3, and Internet Protocol (IP) address standard, described in the request for comment (RFC) 791.

FIG. 1A is a prior art illustration of representative IP address datagram header 100 described in RFC 791. The IP datagram header is the "envelope" in which data is transmitted. It includes header data fields for the Internet Protocol source address 105 of the host sending the datagram and the Internet Protocol destination address 110 of the host to receive the message packet. It also includes other standard data fields, such as a version field 115 which is the version number of the protocol; an Internet header length (IHL) field 120 corresponding to the length of the header; type of service field 125 corresponding to various levels of speed and reliability; a total length field 130 corresponding to the total length of the datagram; an identification field 135 which is a value used for a fragmented datagram to indicate that a fragment belongs to a particular datagram; a flags field 140, typically used to indicate whether the packet is the last fragment; a fragment offset field 145, used to indicate where the datagram fragment belongs in a set of fragments; a time to live field 150, which is decremented with every pass through a router and which is used to discard a packet after a preset number of routing attempts; a protocol field 155 corresponding to the transport layer process used to accept the datagram; a header checksum field 160, which is an error correction code for the header; and options/padding field 165, an optional information and filler added so that the header is a multiple of 32 bits. FIG. 1B is an exemplary portion of a message packet in accord with the RFC 791 standard. As can be seen in FIG. 1B, the header data fields of a particular packet correspond to numerical codes. Additionally, message packet 100 includes other user data fields 160, 165, 170 for performing other functions, such as transporting a payload.

FIG. 2A is a prior art illustration of a representative Ethernet address header 200 similar to that described in IEEE standard 802.3. It includes fields for the source address 205 and destination address 210 of the message packet. FIG. 2A also shows a continuation destination address field 220 and a continuation source field 225 for 48 bit address fields, in accord with a conventional visual representation of an Ethernet address header 200. Additionally, it includes a data field for the Ethertype 215. The Ethertype field is a code that is assigned by the IEEE Ethertype Field Registration Authority. The Ethertype field is typically used to provide a means of protocol identification, i.e., the developer of a data transport protocol registers an Ethertype. There is one Ethertype reserved for IP packets over Ethernet. Additionally, as shown in FIG. 2B, an organization may obtain an Organizationally Unique Identifier (OUI) from the IEEE Registration Authority to uniquely identify each node of a network. Each IEEE network interface is uniquely identified. An Organization building nodes may obtain an OUI from the IEEE from which they can create unique identifiers, i.e., the organization may buy a range if potential IDs that can be distinguished by the OUI field and then assign these IDs to the equipment they provide or sell. The OUI/company ID is a 24 bit globally unique assigned number. The OUI is used in the family of IEEE 802 standards for local area networks, Ethernet, and token rings. The OUI is used by a manufacturer to specify the unique media access control (MAC) address for each device produced by a manufacturer. For example, an OUI can be used to generate 48-bit Universal local area network MAC addresses to uniquely identify LAN stations and metropolitan area network (MAN) stations. A single Ethertype field is all that is required to limit reception of a message packet to a particular class of devices. There are also provisions for sub-type fields. FIG. 2B shows an exemplary destination address field for an IEEE 802 MAC header. It includes an OUI field 270, a vendor field 275, and other optional fields 280, 285. The M-bit 280 in the Ethernet address can be used to establish a multicast address to be received by a group of stations. There is also a broadcast address option to permit all Ethernet interfaces to receive a frame having the broadcast address.

Data networks may experience failures in individual nodes or the data links between nodes. FIG. 3 shows a linear chain network 300 having a plurality of network nodes 302, 304, 306, and 308 coupled by data links 310. Network 300 may, for example, comprise a chain of network elements regenerating a signal over a long distance. Network 300 may also comprise a portion of a larger network, such as a branched chain network (as indicated in phantom) with data links 380 and 382 and nodes 390 and 392 coupled to node 308. As illustrated by break 315, a fault may occur along a portion of a data link. Alternately, a signal node, such as node 304, may also fail and disrupt traffic.

Network faults disrupt communications between network elements, resulting in lost data traffic. It is desirable to quickly detect not only the occurrence of a fault but also its location so that redundant elements may be switched into service and/or field repairs made to repair the fault commenced as soon as possible. For optical networks, one approach to the problem of network faults is the synchronous optical network (SONET) protocols for monitoring performance in the time division multiplexing (TDM) domain. However, in the event of a network fault provisioning and configuration of the network elements is required with new addressing and routing information, i.e., the system negotiates and assigns new fixed addresses for each node after determining the topology of the system and the new signal paths.

One drawback of conventional message packet protocols is that it may take longer than desired for the network to perform the provisioning and configuration process to determine the new topology and/or assign new addresses. This may result, for example, in lost traffic during the provisioning and configuration process. The time required to negotiate and assign new addresses also limits the ability of the system to make electrical equipment switches or line equipment switches on sub-sections of the network.

Therefore, there is a need for an improved message packet protocol for data networks that can deliver message packets even if the network is not provisioned or configured.

SUMMARY OF THE INVENTION

The present invention broadly comprises a relative address protocol and method for sending message packets to a destination node a preselected number of nodes away from a source node along a portion of a network, such as a linear chain network. One aspect of the present invention is that it does not require the use of a fixed, assigned, or pre-known network address to send message packets to a destination node. One application of the address protocol is to send status query messages to nodes, such as a regenerator node of a regenerating chain, requesting the node to return a status message, such as a status message indicating that the regenerator node is functional.

An embodiment of a relative address protocol of the present invention generally comprises: an identifier field containing an identifier to identify the message packet as having a relative address protocol; and a relative destination address field including a counter programmed with an initial value at the source node corresponding to a destination node that is a preselected number of nodes away from the source node along the linear chain; wherein the counter is adjusted by a preselected step in value at each node the message packet is forwarded to along the chain until the counter reaches a trigger value indicating that the destination node has been reached. In a preferred embodiment, the protocol also includes a relative source address field for storing the initial value, whereby a destination node may determine a relative address back to the source node. In one embodiment, the protocol is used to send a message packet that is a status query message to the destination node, the status query message requesting the destination node to send a message back to the source node reporting on its condition. In one embodiment the protocol is used in a linear chain network comprised of regenerator nodes used to regenerate message packets.

The present invention also includes methods of sending a message packet from a source node to a destination node using a relative address protocol having an identifier field for an identifier, a relative source address for storing an initial value, and a relative destination address field for containing a counter. The method generally comprises the steps of: selecting an initial value that is a function of a desired number of node hops along the linear chain from the source node; programming the counter to have the initial value; adjusting the value of the initial value of the counter by a preselected step in value at each node that the message packet is forwarded to; and accepting the message packet at a destination node when the counter value reaches a preselected trigger value wherein the preselected step in value is chosen so that the initial value reaches the trigger value when the packet has traversed the desired number node hops. In a preferred embodiment, the message packet comprises a status query message and further including the steps of: requesting the destination node to send a status message packet having a second identification field and a second counter back to the source node; programming the second counter to have the initial value; adjusting the value of the initial value of the second counter by the preselected step in value at each node that the message packet passes through; and accepting the message packet when the counter value reaches the preselected trigger value; whereby the status message packet is returned to the source node. An embodiment of the method for use in fault detection includes sending a plurality of status query reply messages to nodes having different relative addresses and determining the node the largest number of node hops from the source node returning a status message indicating that the node is operational. In one embodiment of the method, the network nodes are regenerator elements, whereby a fault in a regenerator element may be determined.

DETAILED DESCRIPTION OF THE PREFERRED EMBODIMENTS

The figures depict a preferred embodiment of the present invention for purposes of illustration only. One of skill in the art will readily recognize from the following discussion that alternative embodiments of the structures and methods disclosed herein may be employed without departing from the principles of the claimed invention.

Figure 4:
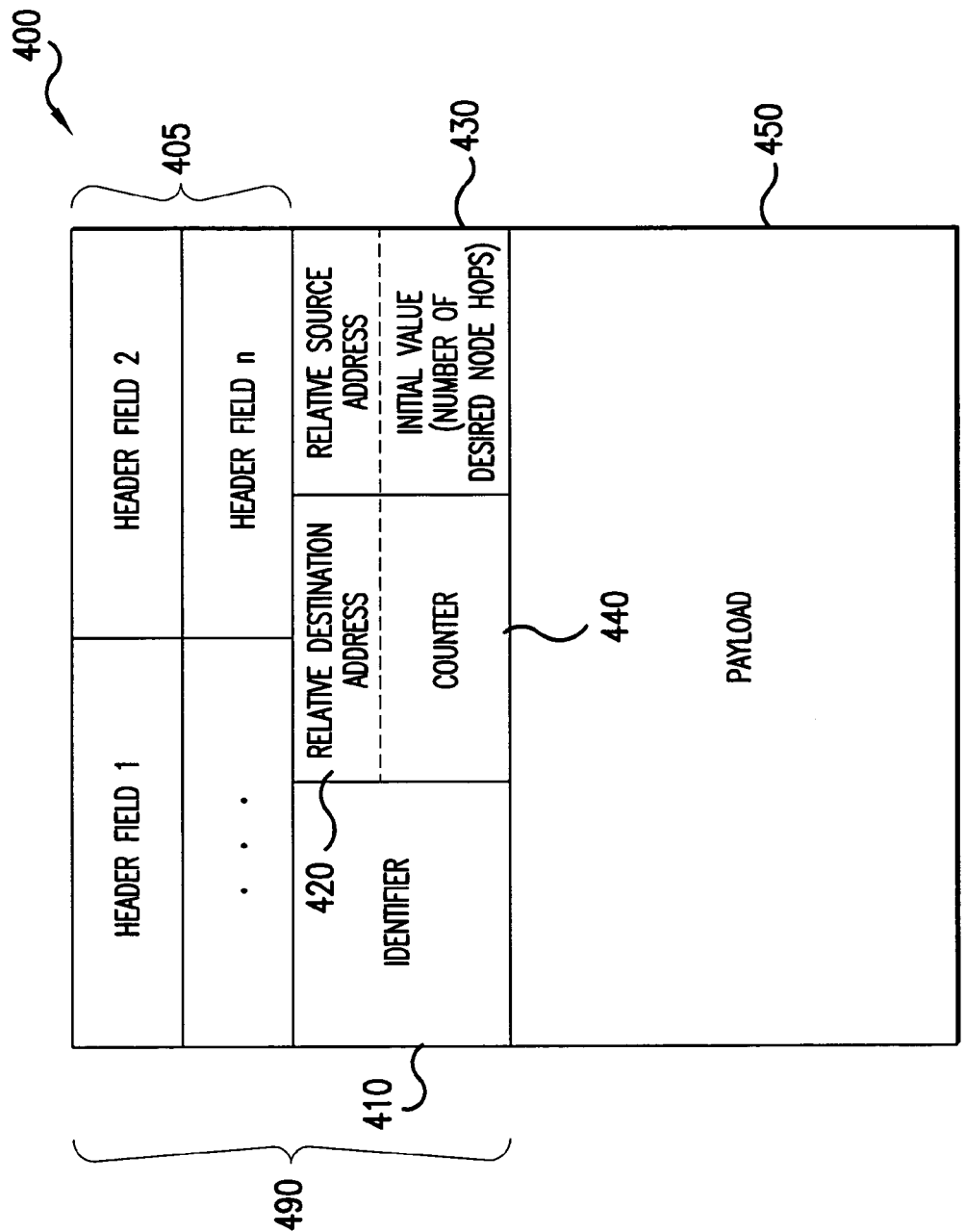
FIG. 4 is an illustrative diagram of a relative address protocol format in accordance with the present invention.

FIG. 4 shows an embodiment of a relative address protocol 400 of the present invention. The relative address protocol 400 of the present invention may be used for communicating message packets along a portion of a network acting as a network chain of nodes coupled by data links. It will be understood that chain networks include sections of networks that function like linear chain networks over a portion of the network. As used in this application, the term "node" includes the broad meaning that a node is a point in a network where at least two data communication lines are interconnected. This includes conventional network nodes that couple data to network devices or to tributary networks. However, it will also be understood that as used in this application a node also includes a variety of network elements for generating, forwarding, receiving, regenerating, or altering an attribute of a message packet. In particular, as used in this application a chain network includes any chain connection of packet data network elements coupled in a chain configuration by data links, such as a chain of regenerative network elements for transporting a message packet over a long distance. For example, in the optical network art, this includes a chain network formed by linking a sequence of optical fibers and optical regenerators to form a long distance communication link.

As shown in FIG. 4, relative address protocol 400 includes a header portion 490 and a payload data unit 450. Relative address protocol 400 is preferably implemented as a variation of conventional packet data protocols used in network systems, such as IP address and MAC protocols used in Internet and optical network applications.

The header portion 490 of message packet 400 may thus include one or more as standard header fields 405 (indicated by header fields 1 to n) used in common message protocols, such as header fields for header length. However, unlike conventional message packet data protocols, relative address protocol 400 includes an identifier field 410 for storing an identifier and a relative destination address field 420 configured to permit message packets to be forwarded by a pre-selected number of nodes along a chain network relative to a source node.

The relative destination address field 420 comprises a field for a counter 440 for for counting the number of nodes that that the message packet has encountered ("hopped") from the source node. It will be understood that relative destination address field 420 may also include a sub-field for other information, such as a directional code corresponding to the port (e.g., the north or south port of the source node) from which the message packet is to be sent along the chain. A relative source address field 430 is also preferably included that records the initial value of the pre-selected number of node hops, since this information provides a destination node a relative return address back to the source node. If the present invention is implemented as a modified Internet Protocol packet, the relative destination address (e.g., the counter 440) and relative source address 430 may be formed in a field traditionally used for an IP fixed address field 105, 110 of a conventional Internet Protocol 100. In an analogous manner, if the present invention is implemented as a modified MAC protocol, the relative destination address 420 (e.g., the counter 440) and relative source address 430 (e.g., the initial value of desired node hops from the source) may be implemented in two address fields 205, 210 of a conventional MAC protocol 200.

The identifier 410 may be recorded in a field of conventional packet protocol reserved for a conventional protocol or message type identifier. For a modified MAC protocol implementation, the identifier 405 is preferably an organizationally unique identifier (OUI) 270. The OUI may, for example, be one of the numerical codes available from standard setting bodies such as the Institute of Electrical and Electronics Engineers (IEEE). For IP packets over the Ethernet, the identifier is preferably an Ethertype code 215 or an Ethernet Multicast address. If an Ethernet Multicast address is used the M-Bit in the Ethernet address would be set for multi-cast. For a modified IP protocol implementation, the identifier is preferably a code from the Internet Assigned Numbers Authority (IANA).

It will be understood, however, that conventional message packet protocols have several different fields into which the identifier 410, counter 440, and relative source address 430 of the present invention may be located to alter the function of the message packet protocol from a traditional fixed/assigned address protocol to the relative address protocol of the present invention. Consequently, it is believed that the relative address protocol of the present invention may be implemented as a variation of a variety of conventional data packet protocols.

In a preferred embodiment, the counter 440 is used to count the number of nodes that the message packet passes through ("hops") from its source element relative to an initial value corresponding to a pre-selected number of node hops. The initial value of the number of desired node hops is preferably stored in a relative source address field 430 to facilitate a destination node determining a relative return address of the source node, e.g., three hops to the destination node and three hops back to the source node. Counter 440 interprets each node hop away from the source as a count (e.g., a positive or negative integer) of node hops that brings the packet one hop closer to desired pre-selected initial number of node hops.

The function of counter 440 can be accomplished in several different ways. Counter 440 may be incremented or decremented in value at each new node that the message packet encounters. For example, the counter may start at a value of zero and be increased in value by a pre-selected step in value (incremented in value) at each subsequent node until the counter reaches the pre-selected initial value of node hops. Alternately, the counter may start at the pre-selected value of node hops and be decreased in value by a pre-selected step in value (decremented in value) at each subsequent node. For example, in a countdown mode, the counter may be programmed to pass the packet forward until the counter has counted down to zero. Alternately, in a count up mode the counter may be programmed to pass the packet forward until the counter has counted up from an initial value (e.g., zero) until it reaches the pre-selected number of node hops. In a preferred embodiment, the initial value is an integer corresponding to the desired number of node hops that is stepped in value by one at each subsequent node. However, it will be understood that the initial value may also be a mathematical function of the desired number of node hops, such as an initial value that is a linear function of the desired number of node hops (e.g., ten times the number of desired node hops) as long as the step in value (i.e., the increment or decrement) at each node is correspondingly scaled so that the counter reaches a preselected trigger value after the desired number of node hops has occurred. While a linear function is one possible mathematical function that may be used to map the desired number of node hops into an initial value, it will also be understood that more complex mathematical functions, such as an exponential function (by shifting a bit in a field), may be used to map the desired number of node hops into the initial value as long as the preselected step in value of the counter at each node is adjusted correspondingly so that the counter reaches the trigger value after the desired number of node hops has occurred. While a trigger value of zero is the simplest embodiment, it will be understood that the nodes can be programmed to accept a message packet when the counter has been stepped in value to any pre-selected trigger value.

Figure 5:
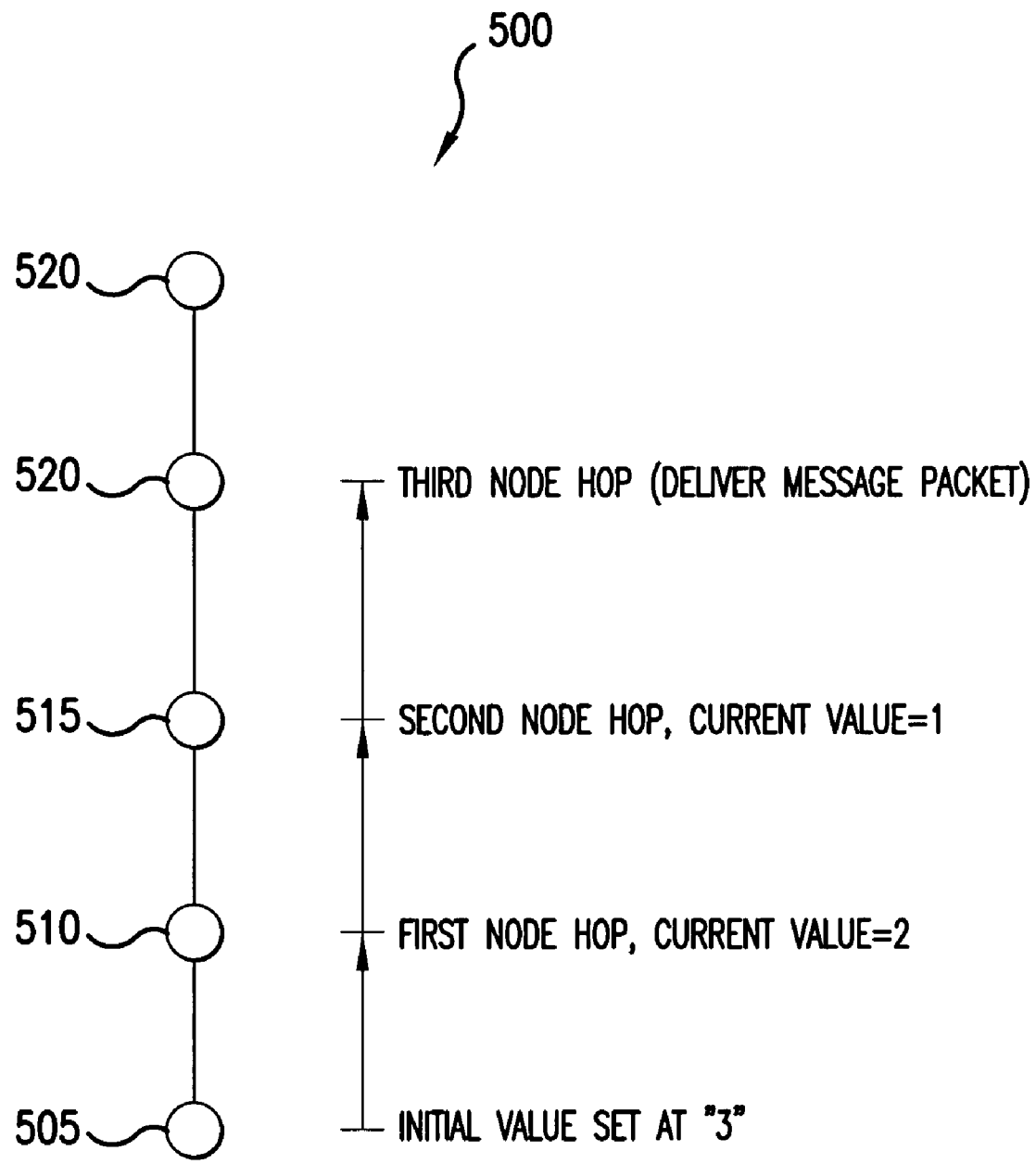
FIG. 5 is an illustrative diagram illustrating a countdown mode of use of the relative address protocol of FIG. 4 in a linear chain network.

FIG. 5 shows an illustrative example of the use of the message packet protocol of the present invention. For the purposes of illustration, a countdown mode is assumed in which the counter begins with an initial value corresponding to he number of desired node hops and is decreased in value at each node by a value of one. A chain network includes nodes 505, 510, 515, 520, and 520 coupled by data links 530 into a chain network. At a source node 505, a message packet 400 has a counter 440 set with an initial value corresponding to three node hops, i.e., an initial value of three. At node 510, the first node hop occurs and the counter is decremented in value by a value of one, changing the current value of the counter to 2. At node 515, the second node hop occurs and the counter is decremented to a current value of 1. At node 520 the third node hop occurs and the counter 440 is decremented to zero, which for a countdown mode with a trigger value of zero means that node 520 will accept the message packet.

Figures 1A, 1B:
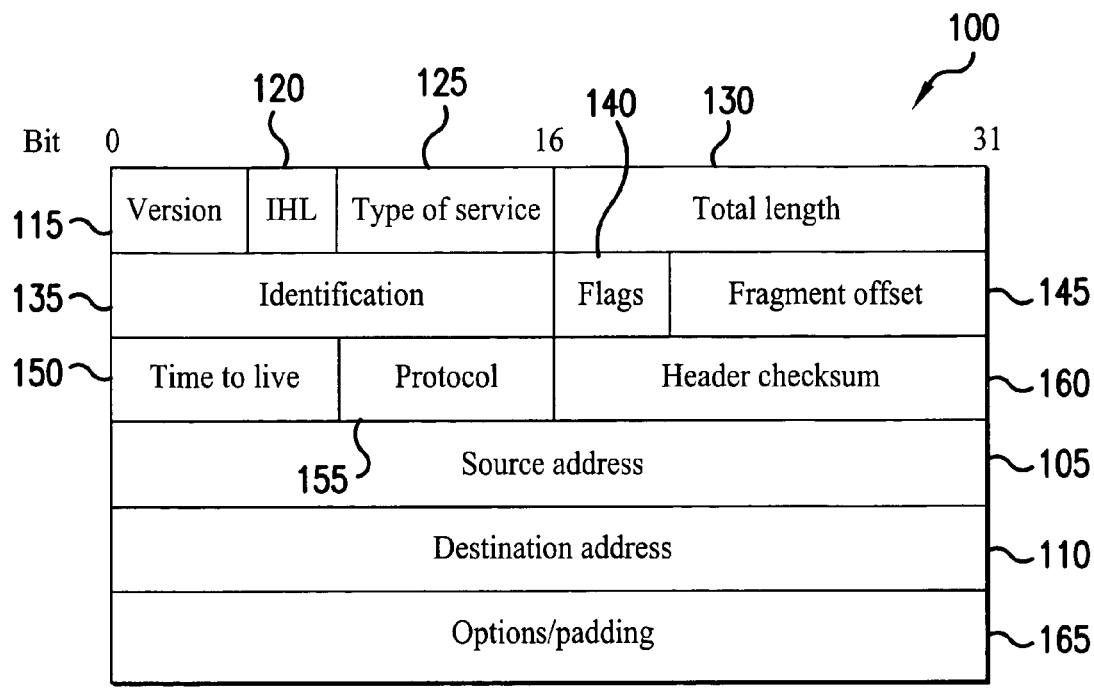
FIGS. 1A and 1B are diagrams of a prior art network packet address header in accord with an Internet Protocol.
Figure 2A:
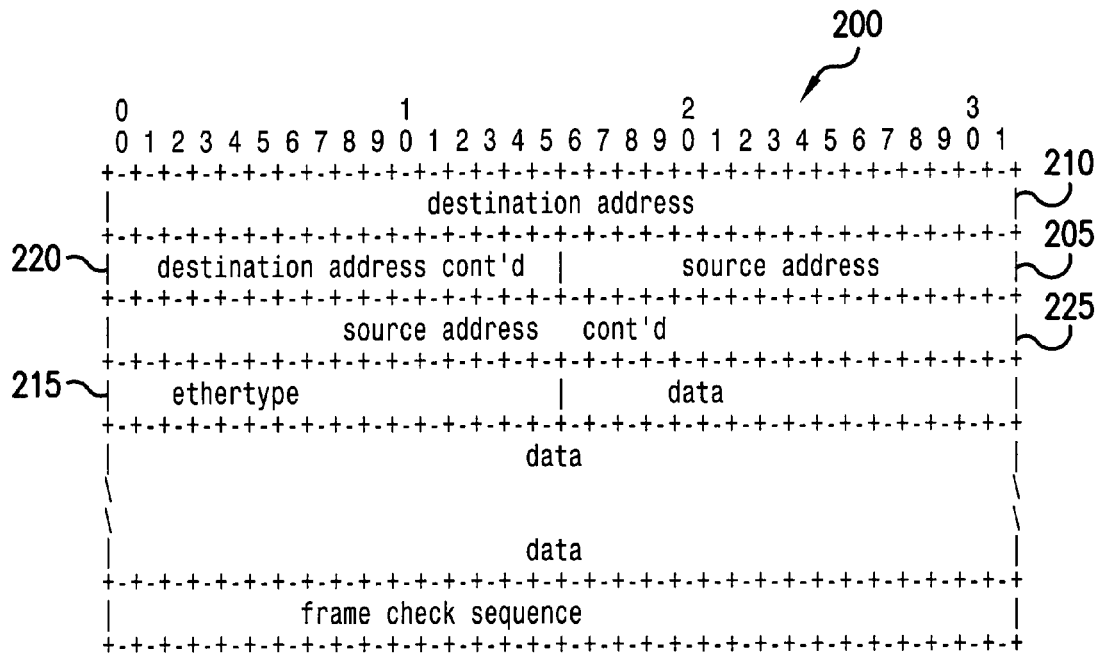
FIGS. 2A and 2B are diagrams of a prior art network packet address header in accord with an Ethernet standard
Figure 2B:
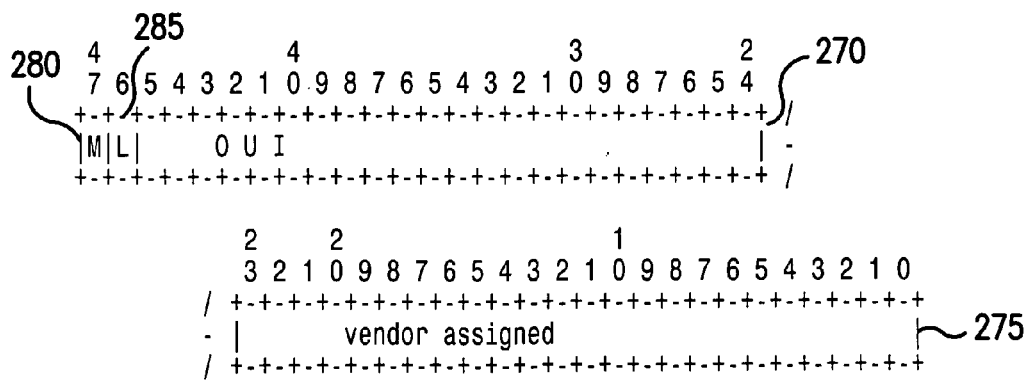
Figure 3:
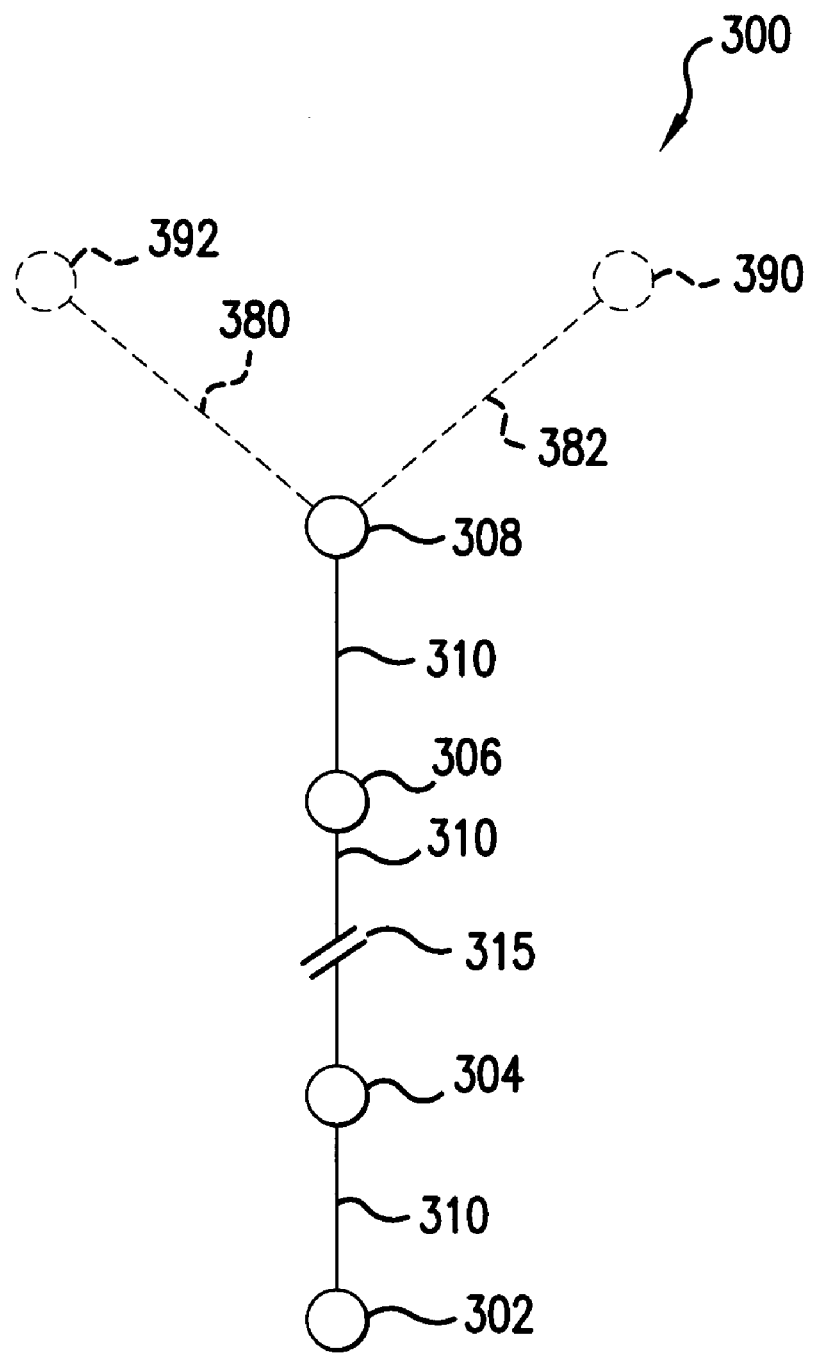
FIG. 3 is an illustrative diagram of a prior art data network having a linear chain portion.

The message packet protocol 400 of the present invention may be used for both chain networks and in portions of networks functioning like chain networks, e.g. quasi-linear chain networks. Referring again to FIG. 3, chain network 300 may be part of a branched chain. Additionally, chain network 300 may also be a virtual chain network formed using data network protocol techniques to limit the path of data in a complicated network topology to a pre-selected chain of nodes within the larger network. For example, a virtual chain may be formed using multiple protocol label switching (MPLS) or variations of virtual channel identifier (VCI) routing used in asynchronous transfer mode (ATM) networks.

One potential application of the relative address protocol of the present invention is to determine the location of network faults in a linear chain network or quasi-linear-chain network. For example, one problem in the network industry is a method of quickly and inexpensively determining the location of a fault in a network that is a chain of nodes in which each node is a regenerator element, such as a regenerator element used to regenerate optical signals from a first optical fiber and transmit the regenerated signals to a second optical fiber. Referring again to FIG. 3, nodes 302, 304, 306, 306, and 308 comprise a local chain network, such as a chain of regenerator elements that are part of a long-distance communication system. It is useful to have a method to rapidly determine where in the chain a failure has occurred. A network fault may disrupt data traffic along a portion of network 300. The network fault may be a failure of a communication link or a regenerator element. A network fault may mean a complete loss of communication between the end nodes 302 and 308. The relative address protocol of the present invention may be used to determine the location of a network fault. A source node, such as node 302, may be programmed to transmit status query messages (e.g., message packets instructing a destination node to send a status report in the return (opposite) direction back to the source node) to nodes along the chain using the relative address protocol 400 of the present invention. For example, the status query message may request a node a pre-selected number of node hops from source node 302 to report its status. A return reply by the node indicates that the node has received the query and is capable of receiving and sending message packets. However, it will be understood that the destination node may return other types of status information as well on the operational characteristics of the node. Note also that a lack of a response by a node 306 may be caused by either a fault in the destination node 306 or a fault 315 in a data link to the node. Consequently, another node at an opposed end of the chain, such as node 308, may also be used to transmit status report messages in the opposite direction along the chain. After the fault is detected, conventional network restoration methods may be used to restore traffic, such as the use of redundant elements to restore traffic or the initiation of field repairs. For example, a node that does not return a status message or a message indicating that it has experienced a fault may be sent a subsequent message instructing the node to engage redundant back-up components.

The relative address protocol 400 of the present invention may be extended for use along sections of more complicated networks by including protocol rules when a data packet encounters a node having two or more output ports, such a node branching into a Y-shaped chain. There are two preferred methods for dealing with the situation that the message packet has hopped along a linear chain until the chain meets a more complex network topology. First, a branching node that receives a packet from a linear chain may be programmed to drop the packet as having an unrecognizable address and cause a timeout condition. Alternately the branching node can be programmed to return an error message indicating that a branching node was reached. Error-reporting protocols, such as Internet Control Message Protocol (ICMP) indication, can be adapted to perform a branching node error message. A branching node error message is preferably returned with a data field that includes the number of node hops that the branching node is relative to the source node.

A ring topology resembles a chain network with its two ends 302 and 308 joined together. Consequently, the relative address protocol 400 of the present invention may also be applied to a section of a network having ring topology by using the relative address protocol to specify the number of node hops in a clock-wise or counter-clockwise direction around a section of the ring. Note that in a ring topology a message packet may be inadvertently forwarded back to the source node. Consequently, if relative address protocol 400 is used in a ring topology at least one address field is preferably included having a source identification code to permit the source node to recognize that a message packet has come back to it from a complete trip around the ring. Depending upon the ring configuration, the ring may transmit data either unidirectionally or bidirectionally. For the case of a bi-directional ring, the relative address protocol 400 preferably includes a field corresponding to the direction (e.g., clockwise or counter clockwise) that the data packet travels with respect to a source node.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An address protocol for forwarding a message packet from a source node to a destination node along a sequence of communicatively coupled nodes functioning as a linear chain network, the address protocol comprising:

a relative source address field programmed with an initial value at the source node corresponding to a destination node that is a preselected number of nodes away from the source node along the linear chain network;

a relative destination address field containing a counter and a directional code corresponding to a port of the source node from which the message packet is to be sent along the linear chain network;

wherein the counter is incremented by a preselected step in value at each node the message packet is forwarded to along the chain network until the counter reaches the initial value, thereby indicating that the destination node has been reached;

an identifier field containing an identifier, wherein the identifier indicates whether the message packet contains relative address protocol information;

wherein the destination node does not require address information in addition to the counter reaching the initial value to accept the message packet; and wherein, when in the sequence of communicatively coupled nodes functioning as a linear chain network, each message packet encounters a branching node having two or more output ports before reaching the destination node, the branching node has programming configured to return a message indicating that the branching node was reached and reporting the number of hops the branching node is away from the source node.

2. The protocol of claim 1, wherein the initial value is an integer having an absolute value equal to the desired number of node hops and the counter is incremented by a step in value of one at each node.

3. The protocol of claim 2, wherein the counter is initially set to zero and the counter is counted up by one at each node hop until the initial value is reached.

4. The protocol of claim 1, wherein the initial value is a linear function of the desired number of node hops.

5. The protocol of claim 1, wherein at least one node in the linear chain is a regenerator element.

6. The protocol of claim 1, wherein the chain network is a virtual chain network.

7. The protocol of claim 1, wherein the chain network comprises a portion of a ring network.

8. A method of sending a message packet along a portion of a network functioning as a linear chain network from a source node to a destination node using an address protocol having an identifier field containing an identifier, wherein the identifier indicates whether the message packet contains relative address protocol information, a relative source address field for storing an initial value, and a relative destination address field containing a counter and a directional code corresponding to a port of the source node from which the message packet is to be sent along the linear chain network, the method comprising the steps of:

selecting the initial value to be a function of a desired number of node hops along the linear chain network from the source node;

programming the relative source address field to have the initial value;

incrementing the counter by a preselected step in value at each node that the message packet is forwarded to;

accepting the message packet at a destination node when the counter value reaches the initial value, without requiring address information in addition to the counter reaching the initial value to accept the message packet, wherein the preselected step in value is chosen so that the counter reaches the initial value when the packet has completed the desired number of node hops; and wherein, when in the sequence of communicatively coupled nodes functioning as a linear chain network, each message packet encounters a branching node having two or more output ports before reaching the destination node, the branching node has programming configured to return a message indicating that the branching node was reached and reporting the number of hops the branching node is away from the source node.

9. The method of claim 8, wherein the message packet comprises a status query message and further comprising the steps of:

requesting the destination node to send a status message packet having a second relative source address field and a second counter in a direction along the chain back to the source node;

programming the second relative source address field to have the initial valued-incrementing the second counter by the preselected step in value at each node that the message packet is forwarded to; and accepting the status message packet when the counter reaches the initial value, wherein the status message packet is returned to the source node.

10. The method of claim 9, wherein at least one of the nodes of the chain includes a regenerator element.

11. The method of claim 9, further comprising the steps of:

selecting a return message;

transmitting the return message in the direction to the source node;

incrementing the second counter by the preselected step in value at each node that the message packet is forwarded to; and accepting the return message packet at the source node when the second counter reaches the initial value.

12. The method of claim 8, further comprising the step of:

detecting a fault in a linear chain of regenerator nodes using the relative address protocol by:

sending a first status query message packet requesting a return status message from a destination node at least one node hop from the source node;

sending at least one subsequent status query message packet requesting a return status message from another destination node corresponding to a different number of node hops from the source node and recording whether the return status message is received at the source node; and determining the node the greatest number of node hops from the source node replying to the status query message directed to it, wherein a fault is isolated to a portion of the chain network subsequent to the node the greatest number of node hops from the source node returning the corresponding status message.

13. A method of sending a message packet along a chain network having regenerator nodes from a source node to a destination node using an address protocol having an identifier field containing an identifier, wherein the identifier indicates whether the message packet contains relative address protocol information, a relative source address field for storing an initial value, and a relative destination address field containing a counter and a directional code corresponding to a port of the source node from which the message packet is to be sent along the linear chain network, the method comprising the steps of:

selecting the initial value to be a function of a desired number of node hops along the linear chain from the source node;

incrementing the counter by a preselected step in value at each node that the message packet is forwarded to;

accepting the message packet at a destination node when the counter value reaches the initial value, without requiring address information in addition to the counter reaching the initial value to accept the message packet, wherein the preselected step in value is chosen so that the counter reaches the initial value when the packet has completed the desired number of node hops; and wherein, when in the sequence of communicatively coupled nodes functioning as a linear chain network, each message packet encounters a branching node having two or more output ports before reaching the destination node, the branching node has programming configured to return a message indicating that the branching node was reached and reporting the number of hops the branching node is away from the source node.

14. The method of claim 13, wherein the message packet comprises a status query message and further comprising the steps of:

requesting the destination node to send a status message packet having a second relative source address field and a second counter back to the source node;

programming the second relative source address field to have the initial valued-incrementing the second counter by the preselected step in value at each node that the message packet is forwarded to; and accepting the message packet when the second counter reaches the initial value, wherein the status message packet is returned to the source node.

15. The method of claim 14, further comprising the steps of:

sending a plurality of the status query messages to a plurality of destination nodes, the destination nodes corresponding to different initial values indicating that the destination nodes are each a different number of node hops from the source node;

receiving the status message packets from responding destination nodes; and determining the relative distance of responding nodes as a function of the initial value corresponding to each responding node, wherein a fault is isolated to a part of the network subsequent to the responding active node the greatest number of node hops from the source node.

* * * * *